United States Patent
Chapman et al.

(10) Patent No.: US 11,104,593 B2
(45) Date of Patent: Aug. 31, 2021

(54) COMPOSITIONS EXHIBITING SYNERGY IN BIOFILM CONTROL

(71) Applicant: SOLENIS TECHNOLOGIES, L.P., Wilmington, DE (US)

(72) Inventors: John S. Chapman, Wilmington, DE (US); Corinne E. Consalo, Wilmington, DE (US)

(73) Assignee: SOLENIS TECHNOLOGIES, L.P., Wilmington, DE (US)

( * ) Notice: Subject to any disclaimer, the term of this patent is extended or adjusted under 35 U.S.C. 154(b) by 132 days.

(21) Appl. No.: 16/161,355

(22) Filed: Oct. 16, 2018

(65) Prior Publication Data

US 2019/0112207 A1    Apr. 18, 2019

Related U.S. Application Data

(60) Provisional application No. 62/573,928, filed on Oct. 18, 2017.

(51) Int. Cl.
| | | |
|---|---|---|
| *A01N 25/04* | (2006.01) | |
| *A01N 25/30* | (2006.01) | |
| *A01N 59/00* | (2006.01) | |
| *C02F 1/50* | (2006.01) | |
| *C02F 103/02* | (2006.01) | |
| *C02F 103/28* | (2006.01) | |

(52) U.S. Cl.
CPC .............. *C02F 1/50* (2013.01); *A01N 25/04* (2013.01); *A01N 25/30* (2013.01); *A01N 59/00* (2013.01); *C02F 2103/023* (2013.01); *C02F 2103/28* (2013.01); *C02F 2303/20* (2013.01); *C02F 2305/04* (2013.01)

(58) Field of Classification Search
CPC ........ A01N 25/04; A01N 25/30; A01N 59/00; C02F 1/50; C02F 2103/023; C02F 2103/28; C02F 2303/20; C02F 2305/04
See application file for complete search history.

(56) References Cited

U.S. PATENT DOCUMENTS

| | | |
|---|---|---|
| 5,670,055 A | 9/1997 | Yu et al. |
| 7,052,614 B2 | 5/2006 | Barak |
| 7,285,224 B2 | 10/2007 | Barak |
| 7,820,060 B2 | 10/2010 | Mayer et al. |
| 7,837,883 B2 | 11/2010 | Barak |
| 8,778,646 B1 | 7/2014 | Chapman et al. |
| 9,555,018 B2 | 1/2017 | Consalo et al. |
| 2006/0231505 A1 | 10/2006 | Mayer et al. |
| 2008/0274929 A1 | 11/2008 | Whitekettle et al. |
| 2008/0317702 A1 | 12/2008 | Edgington et al. |
| 2011/0052656 A1* | 3/2011 | Whitekettle .............. C02F 1/50 424/421 |
| 2012/0232153 A1 | 9/2012 | Griese et al. |
| 2014/0369953 A1 | 12/2014 | Purschwitz et al. |
| 2015/0351389 A1 | 12/2015 | Kolari et al. |

FOREIGN PATENT DOCUMENTS

WO    2009143511 A1    11/2009

OTHER PUBLICATIONS

Kull, F.C. et al. "Mixtures of Quaternary Ammonium Compounds and Long-chain Fatty Acids as Antifungal Agents", Appl. Microbiology, 1961 Nov., pp. 538-541; vol. 9, No. 6.

Sambrook, J., et al. "Molecular Cloning: A Laboratory Manual," Second Edition, 1989, Cold Spring Harbor Laboratory Press, Cold Spring Harbor, NY.

ISA/US, International Search Report and Written Opinion issued in Intl. App. No. PCT/US2018/055527, dated Jan. 9, 2019.

* cited by examiner

*Primary Examiner* — Lucas A Stelling
(74) *Attorney, Agent, or Firm* — Lorenz & Kopf, LLP

(57) ABSTRACT

A method of controlling and removing biofilm on a surface in contact with an aqueous industrial system comprising the step of adding an effective amount of biofilm-disrupting agent and adding a biocide to the aqueous system being treated to reduce and remove biofilm forming microbes from a surface in contact with the aqueous system is disclosed. Also disclosed is a synergistic composition of polyethyleneimine and an oxidizing biocide.

12 Claims, No Drawings

COMPOSITIONS EXHIBITING SYNERGY IN BIOFILM CONTROL

CROSS-REFERENCE TO RELATED APPLICATION

This application claims priority to Provisional Patent Application No. 62/573,928, filed Oct. 18, 2017, which is incorporated herein by reference in its entirety.

TECHNICAL FIELD

The present disclosure pertains to the control of microorganisms in an aqueous environment.

BACKGROUND

Microbial biofilms in industrial, commercial, and civic systems and structures have substantial negative impacts on the functioning and operation of those systems and structures, including reducing heat transfer, plugging pipes and lines, serving as a reservoir of pathogens, causing mechanical and structural failure, promoting corrosion, contaminating and degrading products, drinking and recreational water, and reducing aesthetic values.

Biofilms are defined in the context of this document as microbes which settle, attach, and then grow or exist on surfaces. The may be composed of a single species or they be poly specific, and may consist of bacteria, viruses, fungi, algae, and micro- or macro-eukaryotic organisms such as amoeba, diatoms, nematodes, and worms. Biofilms may exist submerged in liquid, in splash zones, moist environments, and even dry environments such as those found on the surfaces of statuary and buildings. Biofilms are structurally composed of microbial cells encased in a molecularly diverse polymeric matrix composed of polysaccharides, protein, DNA, and numerous small molecules. In natural environments they also can entrain dirt, soil, vegetable matter, and other environmental components. This material is often referred to as slime. The anatomy of a biofilm is extensively influenced by the composition of the environment and the shearing force supplied by the movement of the matrix over the film.

The consequences of microbes living in a fixed environment as opposed to free-floating in the bulk fluid are extensive with the microbes differentiating expression of their genome ranging from a few genes to almost 50% of their genome. These changes have an immense effect on the susceptibility of the biofilm cells to chemical biocides, antibiotics, and other environmental stressors. In addition to the widespread physiological alterations the biofilm cells exist in the polymeric matrix which can interfere with the access of biocides or antibiotics to the cells, further reducing their susceptibility. Changes in biocide and antibiotic susceptibility of over one thousand-fold have been documented.

The most common approach to the control of biofilms has been the application of chemical biocides including oxidizing, reactive, and membrane-active biocides. Regardless of the mechanistic class of biocides biofilms have proven far more recalcitrant to their inhibitory and cidal action for the reasons discussed in the previous paragraph resulting in the need to apply high concentrations of biocide to achieve a desired effect.

Oxidizing biocides are commonly used as biofilm control agents in a wide variety of industrial, commercial, and civic areas because they are inexpensive and effective against planktonic microbes. They can be effective microbial control but high application rates, costs to treat, and the corrosive effect of the oxidants on materials of construction, as well as regulatory limitations in some cases, often make it difficult to apply them at rates effective for long-term biofilm control.

Oxidizing biocides, although they can kill substantial portions of the biofilm population, are not effective in removing biofilms from the surface. This is not satisfactory since some of the negative effects of biofilms derive from their physical presence on the surface. For instance, biofilms are excellent insulators and vastly impede heat transfer in cooling towers and chillers and although a treated biofilm may be substantially dead it will still insulate the surface. In addition, the large numbers of dead cells provide the surviving fragment of the treated population with a ready source of nutrients and biofilms tend to quickly re-grow to their original density.

Adjunct treatments in the form of biofilm-disrupting materials have been administered in conjunction with biocides to increase efficacy in both killing the microbes and removing them from the surface. These biofilm disrupting agents are most often anionic, cationic, or non-ionic surfactants whose presumed mechanism is to interact with the biofilm structure which both allows a more efficient penetration of the biofilm by the biocide and to remove biofilm by their surface-active properties Despite the long presence of these biofilm disrupting agents in the market they are most often underutilized likely due to the efficacy of treatment programs using both oxidizing and non-oxidizing biocides. However, market, cost, and environmental concerns have brought about a desire to reduce the use of biocides without a reduction in the efficacy of microbial control programs and interest in dispersants has been increasing in many markets, particularly industrial cooling waters. As one would expect relative abilities of these biofilm disrupting agents ranges from poor to good and their efficacy can be influenced by the composition of the bulk matrix. One would also expect that some combinations of oxidizing biocides and biofilm disrupting agents would be more efficacious than others based on the interaction of their chemistry and effect on the biofilm structure.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The following detailed description is merely exemplary in nature and is not intended to limit the invention or the application and uses of the invention. Furthermore, there is no intention to be bound by any theory presented in the preceding background of the invention or the following detailed description.

It has been surprisingly found that some combinations of biocides, preferably oxidizing biocides, and biofilm disrupting agents exhibit synergistic control of biofilms in terms of both killing them and removing them from the surface. The total effect of the combination of biocides and biofilm disrupting agents is far greater than the mere additive effect of the two chemicals such that the amounts of one, or both, chemicals can be greatly reduced and still achieve the desired endpoint of biofilm control. This synergistic interaction has not been found for all combinations of chemicals, nor at all ratios of the two chemicals.

Disclosed is a method of controlling and removing biofilm on surfaces in contact with an aqueous industrial system comprising the step of adding an effective amount of biofilm-disrupting agent and adding a biocide to the aqueous system being treated to reduce and remove biofilm forming microbes from a surface in contact with the aqueous system.

The invention also provides for a synergistic composition comprising a biofilm-disrupting agent and a biocide.

Oxidizing biocides useful in the invention include sodium hypochlorite, calcium hypochlorite, and other hypochlorite salts, hypochlorous acid, hypobromous acid, monohaloamine biocides derived from ammonium hydroxide, ammonium chloride, ammonium sulfate, ammonium acetate, ammonium bicarbonate, ammonium bromide, ammonium carbonate, ammonium carbamate, ammonium sulfamate, ammonium nitrate, ammonium oxalate, ammonium persulfate, ammonium phosphate, ammonium sulfide, urea and urea derivatives, and other nitrogen containing compounds capable of donating an ammonium ion, being reacted with a chlorine or bromine moiety such as a chlorinated or brominated oxidant preferably hypochlorous acid or hypochlorite, preferable hypochlorite; and blends of ammonium-derived chloramine compounds such as monochloramine and dichloramine. Such haloamine biocides are known in the art see for example U.S. Pat. Nos. 7,285,224, 7,052,614, 7,837,883, 7,820,060. Other oxidizing biocides include dibromonitrilo propionamide, bromochloro-dimethyl hydantoin and other halogenated hydantoins, and trichloroisocyanuric acid. Non-oxidizing biocides used against biofilms and expected to work with the dispersant include isothiazolone biocides, glutaraldehyde, formaldehyde and formaldehyde-releasing compounds, tetrakis-hydroxy phosphonium chloride, as well as other non-cationic biocides.

The present invention provides a method for controlling microbial biofilm on surfaces in contact with systems, including but not limited to aqueous systems, comprising adding to the system a synergistic combination of an oxidizing biocide and a biofilm-disrupting agent or dispersant comprised of a polyethyleneimine surfactant. Polyethyleneimine is a polymeric amine with a high charge density that allows for it to absorb tightly to negatively charged substrates.

The charge density can be from 8 to 20 meq/gram of material, preferably from 10 to 20 meq/gram of material and most preferable from 14 to 20 meq/gram of material. It is a water-soluble polymer generally made by the polymerization of ethyleneimine. It can contain primary, secondary and tertiary amines. Example polyethylene imines are available under the trademark name Lupasol™ (BASF, Florham Park, N.J.).

The biofilm-disrupting agent used in the invention is Polyethyleneimine ("PEI"), a low molecular weight ethyleneimine copolymer. The average molecular weight of the polyethyleneimine is less than 750,000 daltons, preferably less than 100,000 and greater than 500 daltons. The average molecular is generally from 750 to 25,000, preferably from 800 to 4000 more preferable from about 1000 to about 3000. Examples of the polyethyleneimine surfactants include, but are not limited to, the BASF Lupasols (BASF Corporation, Florham Park, N.J.). The dispersant comprises from about 20 to about 98 percent by weight of polyethyleneimine, with the remainder of the dispersant comprising water, which can be present in an amount of from about 2 to about 80% by weight. Additional components may include solvents, such as low molecular weight alcohols, for example, ethanol, methanol and butanol.

One embodiment of polyethyleneimine is comprised of from about 40 to about 50% water and about 40 to about 50% PEI polymer with aziridine. The concentration provided in the invention are polyethyleneimine polymer only, no other component or solvent of the commercially available PEI product is considered part of the dosage range. For example, 50 gm of a 50% PEI product is a dosage of 25 gm PEI.

The invention also provides for a synergistic composition comprising a biofilm-disrupting agent and a biocide, wherein the biofilm-disrupting agent is polyethyleneimine and the biocide is a haloamine preferable selected from monohaloamine, dihaloamine and combinations thereof. The haloamine can be chloramine. Preferably the weight ratio of biofilm disrupting agent to the oxidizing biocide is from 1-part biocide to at least 1-part biofilm disrupting agent. The weight ratio of biocide to biofilm-disrupting agent can be from 1:1 to 1:80, or from 1:1 to 1:40, or from 1:1 to 1:20, more preferable for 1:1 to 1:8.

The interactions of two chemicals in a composition can occur in three possible manners. In the first manner the two chemicals interact in a negative manner to diminish the combined effect of the composition such that the result achieved is less than what one would expect from their combined activities. Thus, if one agent by itself achieves a value of 50 in a measured variable and the second agent by itself achieves a value of 50, in a negative interaction the combined reduction value for the two would be less than 100. Another manner in which they can interact is additive, in which the final result is the simple addition of the two values. Thus two agents, each capable of achieving a value of 50, are combined their total combined value would be 100. In the third manner, which is the most desirable in the case of microbial control, the result of combining two agents, each capable of achieving a value of 50, would be some value greater than 100.

Researchers have developed formula for measuring the nature and extent of interactions between components in a composition. In the area of microbial control, the most commonly used equation is that described in Kull et al (Kull et al., 1961, J. Appl. Microbiology 9:538) which by reference is incorporated into this document. Recent examples of the use of this equation in patents are U.S. Pat. No. 9,555,018, Synergistic combinations of organic acids useful for controlling microorganisms in industrial process, and U.S. Pat. No. 8,778,646, method of treatment of microorganisms during propagation, conditioning, and fermentation using hops acid extracts and organic acid. The original Kull equation used the minimal inhibitory concentration of antimicrobial agents (MIC) as the endpoints of determination. The MIC values is the lowest measured concentration of antimicrobial agent that results in the inhibition of a microbial culture. Inhibition may be determined visually by examining turbidity of a microbial culture, it may be determined by counting viable cells by culture-based or microscopic methods, or by some measure of metabolic activity, among other possible means. The equation is presented below:
Synergy Index=(Endpoint a/Endpoint A)+(Endpoint b/Endpoint B) in which Endpoint A is that of agent A by itself, Endpoint a is that of agent A in combination with agent B, Endpoint B is that of agent B by itself, and Endpoint b is that of agent B in combination with agent A.

In this work the efficacy of the agents alone and in combination were determined by measuring the number of viable cells in model biofilms remaining after treatment. The Minimum Biofilm Eradication value (MBEC) is defined as a 95% reduction in the number of viable cells compared to the untreated control. The relatively non-toxic dispersants are unable to reach that level of killing with physically possible concentrations, thus for those agents the MBEC is considered the highest value tested. Since this value is used as the divisor in the synergy index equation this highest tested value is actually an underestimate of the MBEC and thus synergy index values are also underestimated.

This invention is primarily intended for use in industrial process waters, particularly cooling towers, evaporators, chillers, and condensers, but will be of utility in any industrial process where biofilms form in aqueous matrices to the detriment of the process. It is anticipated that the invention can be also be used in geothermal fluid processing, oil and gas extraction, and processes using clean-in-place systems.

The concentration of biofilm disrupting agent, preferably PEI, to be used is in the range of 1 to 200 mg per Liter (ppm) of water in the aqueous system being treated, or preferably of 1 to 100 mg per Liter (ppm) of water, or 1-50 mg/L, from 1 to 15 mg/L, more preferably from 1 to 10 mg/L.

Biocide on an on an active basis as $Cl_2$ is generally dosed in amount of from at least 1.0 (mg/L) ppm as $Cl_2$ or at least 1.5 ppm as $Cl_2$ or preferable at least 2 ppm as $Cl_2$, or greater, or at least 2.5 ppm as $Cl_2$ or greater and up to 15 ppm as $Cl_2$ or more preferable up to 10 ppm as $Cl_2$ based on mg of biocide per Liter of water being treated. Preferably the dosage of biocide is from 1.5 mg to 10 mg biocide per liter of water being treated.

Preferably the weight ratio of biofilm disrupting agent to the biocide, preferably oxidizing biocide, is from 1-part biocide to at least 1-part biofilm disrupting agent. The weight ratio of biocide to biofilm-disrupting agent can be from 1:1 to 1:80 or from 1:1 to 1:40, preferably from 1:1 to 1:20, more preferable from 1:1 to 1:8. Each component as measured by weight.

A person skilled in the art would be able to determine the best dosing point but in general directly upstream of the fouled location is preferred. For instance, the invention could be applied to a cooling tower sump or directly to the cooling tower distribution box or head box thereby treating the cooling water system.

The biofilm disrupting agent and the oxidizing biocide can be added sequentially or simultaneously or the components can be blended together and added as a single composition.

EXAMPLES

Example 1. Synergistic Effects of Monochloramine and PEI

Dose response studies were performed to determine the Minimum Biofilm Eradication Concentration (MBEC) for monochloramine and PEI alone. The MBEC is defined as the concentration of agent that reduces the viable biofilm population by 95% of the untreated control value as measured by viable plate counts. Experiments were then performed to determine the result of combining the two agents, oxidizing biocide monochloramine and dispersant PEI alone, on biofilm populations. The experiments examined three concentrations of monochloramine with four concentrations of PEI alone. The PEI used in the examples was Lupasol™ G20 from BASF.

M9YG media is a simple minimal salt medium supplemented with 500 mg/L glucose and 0.01% yeast extract. The salts composition was intended to mimic a typical cooling tower water composition. The composition of the media was made using the following procedure: 5XM9 salt composition was mixed using 64 gm Na2HPO4.7H2O, 15 grams KH2PO4, 2.5 gm NaCl and 5 grams NH4Cl in one liter of water. This was divided into 200 ml aliquots and sterilized (by autoclave). To 750 ml of sterile deionized water was added the sterile supplement solutions while stirring. A white precipitate will appear on addition of the CaCl2 but will dissolve with stirring.

Supplement solution was 200 ml of 5XM9 composition, 2 ml of 1M MgSO4, 0.1 ml of 1M CaCl2, 20 ml of 20% glucose, 1 ml of 10% yeast extract, and enough water to make 1000 ml of solution. See reference: Molecular Cloning—A Laboratory Manual (Second Edition). 1989. J. Sambrook & T. Maniatis. Cold Spring Harbor Press.

The inoculum used in the examples were overnight cultures of Pseudomonas putida. Pseudomonads are common cooling water contaminants, and while cooling water populations are polymicrobial the pseudomonads are often used in such studies as representative of the population as a whole.

Briefly, biofilms were grown on stainless steel 316 coupons in a CDC Biofilm reactor using M9YG minimal salts growth media for a period of twenty-four hours. PEI alone, monochloramine alone, and combinations of the oxidizer and dispersant were added to the wells of a 12-well cell culture plate. A control was done with M9YG media. After the biofilms were grown, each coupon from the rods in the CDC reactor was unscrewed and dropped into a well of the plate. The plate was then incubated for two hours at 28° C. with shaking. Following the incubation, the coupons were removed from the wells and placed into 5 ml of phosphate-buffered saline (PBS) and sonicated for six minutes. Viable cells released into the fluid were then determined by a plating method.

Synergy indices were calculated by the method of Kull et al. The method determines a defined endpoint for inhibitory concentrations for each antimicrobial agent by itself, and then determines inhibitory levels for combinations of the two agents together. The equation described in Kull, expressed as the MBEC value, is:

$$\text{Synergy Index(SI)} = \text{MBEC } a/\text{MBEC } A + \text{MBEC } b/\text{MBEC } B.$$

Where "MBEC a" is the MBEC value of compound A in combination, "MBEC A" is the MBEC value of compound A by itself, "MBEC b" is the MBEC value of compound "B" in combination, and "MBEC B" is the MBEC value of compound B by itself.

A synergy index of 1 indicates no interactions between the two agents, e.g., the values are simply additive. A SI value of greater than 1 indicates the two compounds interact in an antagonistic manner, while a SI value of less than 1 indicates the two compounds interact synergistically.

Table 1 below shows, monochloramine alone required a concentration of 20 mg/L to achieve a reduction in the viable biofilm population of greater than 90%, and 800 mg/L of PEI achieved a reduction of 71.4%. However, many ratios of the two agents examined exhibited greater activity than could be expected from merely adding that of the two agents alone. For instance, a combination of 2.5 mg/L MCA (⅛ of the value of MCA alone) and 25 mg/L PEI (1/32 of the value of PEI alone) are able to achieve the MBEC goal of 95% reduction in viable biofilm cells. This synergistic effect was obtained with ratios of MCA to PEI of from 1:1.25 to 1:20

TABLE 1

|  | % reduction | Synergy Index | ratio |
|---|---|---|---|
| Control | 0 | | |
| 20 mg/L MCA | 93.58 | | |
| 800 mg/L PEI | 71.4 | | |
| 10 mg/L MCA/200 mg/L PEI | 98.91 | 0.75 | 1:10 |
| 10 mg/L MCA/100 mg/L PEI | 99.8 | 0.63 | 1:5 |
| 10 mg/L MCA/50 mg/L PEI | 99.8 | 0.56 | 1:2.5 |
| 10 mg/L MCA/25 mg/L PEI | 99.59 | 0.53 | 1:1.3 |
| 5 mg/L MCA/200 mg/L PEI | 93.63 | 0.5 | 1:20 |
| 5 mg/L MCA/100 mg/L PEI | 97.98 | 0.38 | 1:10 |
| 5 mg/L MCA/50 mg/L PEI | 95.93 | 0.31 | 1:5 |
| 5 mg/L MCA/25 mg/L PEI | 99.59 | 0.28 | 1:2.5 |

Example 2. Synergistic Effects of Monochloramine/Dichloramine Blend and PEI

Dose response studies were performed to determine the Minimum Biofilm Eradication Concentration (MBEC) for monochloramine/dichloramine blend (MCA/DCA) and PEI alone. The MCA/DCA blend consists of 9 parts MCA and one-part DCA. The MBEC is defined as the concentration of agent that reduces the viable biofilm population by 95% of the untreated control value as measured by viable plate counts. Experiments were then performed to determine the result of combining the two agents, oxidizing biocide MCA/DCA and dispersant PEI alone, on biofilm populations. The experiments examined three concentrations of MCA/DCA with four concentrations of PEI alone.

Briefly, biofilms were grown on stainless steel 316 coupons in a CDC Biofilm reactor using M9YG minimal salts growth media for a period of twenty-four hours. PEI alone, MCA/DCA alone, and combinations of the oxidizer and dispersant were added to the wells of a 12-well cell culture plate. A control was done with M9YG media. After the biofilms were grown, each coupon from the rods in the CDC reactor was unscrewed and dropped into a well of the plate.

The plate was then incubated for two hours at 28° C. with shaking. Following the incubation, the coupons were removed from the wells and placed into 5 ml of phosphate-buffered saline (PBS) and sonicated for six minutes. Viable cells released into the fluid were then determined by a plating method.

Synergy indices were calculated by the method described in Kull et al. as in example 1.

Table 2 below shows, MCA/DCA alone required a concentration of 10 mg/L to achieve a reduction in the viable biofilm population of greater than 90%, and 800 mg/L of PEI achieved a reduction of 71.4%. However, many ratios of the two agents examined exhibited greater activity than could be expected from merely adding that of the two agents alone. For instance, a combination of 2.5 mg/L MCA/DCA (¼ of the value of MCA/DCA alone) and 25 mg/L PEI (⅟32 of the value of PEI alone) are able to achieve the MBEC goal of 95% reduction in viable biofilm cells. This synergistic effect was obtained with ratios of MCA/DCA to PEI of from 1:1.25 to 1:20.

TABLE 2

|  | % reduction | Synergy Index | ratio |
|---|---|---|---|
| Control | | | |
| 10 mg/L MCA-DCA | 97.03 | | |
| 800 mg/L PEI | 71.4 | | |
| 2.5 mg/L MCA-DCA/200 mg/L PEI | 82.81 | NS* | |
| 2.5 mg/L MCA-DCA/100 mg/L PEI | 98.28 | 0.38 | 1:20 |
| 2.5 mg/L MCA-DCA/50 mg/L PEI | 99.68 | 0.31 | 1:10 |
| 2.5 mg/L MCA-DCA/25 mg/L PEI | 99.83 | 0.28 | 1:5 |
| 2.5 mg/L MCA-DCA/10 mg/L PEI | 99.79 | 0.26 | 1:2 |
| 5 mg/L MCA-DCA/200 mg/L PEI | 98.44 | 0.75 | 1:20 |
| 5 mg/L MCA-DCA/100 mg/L PEI | 99.93 | 0.63 | 1:10 |
| 5 mg/L MCA-DCA/50 mg/L PEI | 99.76 | 0.56 | 1:5 |
| 5 mg/L MCA-DCA/25 mg/L PEI | 99.84 | 0.53 | 1:2.5 |

NS* indicates MBEC target was not achieved

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method of controlling and removing microbial biofilm on surfaces in contact with industrial process waters consisting of:
    preparing a composition consisting of polyethyleneimine, a biocide selected from the group consisting of trichloroisocyanuric acid, monochloramines, dichlroamines, tetrakis-hydroxy phosphonium chloride, and combinations thereof, and water; wherein the concentration of PEI is from about 1 mg/L to about 200 mg/L based on amount of water being treated; wherein the concentration of biocide is between 1 mg/L and 15 mg/L as $Cl_2$ based on mg of biocide per liter of water being treated; and wherein the weight ratio of biocide to PEI is from 1:1 to 1:80; and
    adding the composition to the industrial process waters.

2. The method according to claim 1, wherein the biocide is a monochloramine, a dichloramine or a combination thereof.

3. The method according to claim 1, wherein the biocide is derived from the reaction of a chlorine moiety with a nitrogen containing compound capable of donating an ammonium ion selected from the group consisting of ammonium hydroxide, ammonium chloride, ammonium sulfate, ammonium acetate, ammonium bicarbonate, ammonium bromide, ammonium carbonate, ammonium carbamate, ammonium sulfamate, ammonium nitrate, ammonium oxalate, ammonium persulfate, ammonium phosphate, ammonium sulfide, urea and urea derivatives and combinations thereof.

4. The method according to claim 3, wherein the chlorine moiety is hypochlorite.

5. The method according to claim 1, wherein the weight average molecular weight of the PEI is less than 750,000 daltons.

6. The method according to claim 5, wherein the weight average molecular weight of the PEI is between about 500 daltons and about 100,000 daltons.

7. The method according to claim 1, wherein the charge density of the PEI is from 8 to 20 meq/gram of material.

8. The method according to claim 1, wherein the concentration of PEI is from about 1 mg/L to about 200 mg/L based on amount of water being treated.

9. The method according to claim 8, wherein the concentration of PEI is from about 1 mg/L to about 10 mg/L based on amount of water being treated.

10. The method according to claim 1, wherein the concentration of biocide is from 2 mg to 10 mg biocide as $Cl_2$ per liter of water being treated.

11. The method according to claim 1, wherein the weight ratio of biocide to PEI is from 1:1 to 1:8 by weight.

12. The method according to claim 1, wherein the industrial process waters are in an aqueous system is selected from the group consisting of cooling towers, evaporators, chillers, condensers, pulp and paper mills, boilers, wastewater, reclaimed wastewater, mineral slurries, starch slurries, clay slurries, biorefining waters, sludge, colloidal suspensions, irrigation waters, oil and gas waters and combinations thereof.

* * * * *